United States Patent [19]
Robischon

[11] 3,835,335
[45] Sept. 10, 1974

[54] LIQUID LEVEL RESPONSIVE CONTROL SYSTEM

[76] Inventor: John Robischon, 430 Warrior St., S.E., Olympia, Wash. 98503

[22] Filed: Aug. 13, 1973

[21] Appl. No.: 387,931

[52] U.S. Cl................. 307/116, 73/313, 73/DIG. 5
[51] Int. Cl............................................ G01f 23/12
[58] Field of Search........ 200/84 C; 73/305, DIG. 5, 73/313; 317/DIG. 3; 307/116

[56] References Cited
UNITED STATES PATENTS
3,200,645  8/1965  Levins................................ 73/313

Primary Examiner—Herman J. Hohauser
Attorney, Agent, or Firm—Bacon & Thomas

[57] ABSTRACT

A U-tube is connected to a pressure vessel, the vessel and the U-tube containing an operating liquid, and the vessel also being connected to conduit means leading from a source of gas pressure. A bubbler tube is disposed in a container holding the controlling liquid, and is connected to the conduit means. The U-tube includes a sight glass portion having disposed therein a float containing magnetic means, which float rises and falls in response to the level of the controlling liquid in the container. Spaced, magnetically responsive switches are mounted on the U-tube to be operated by the float, the switches being connected into a circuit for operating equipment controlled by the system.

6 Claims, 3 Drawing Figures

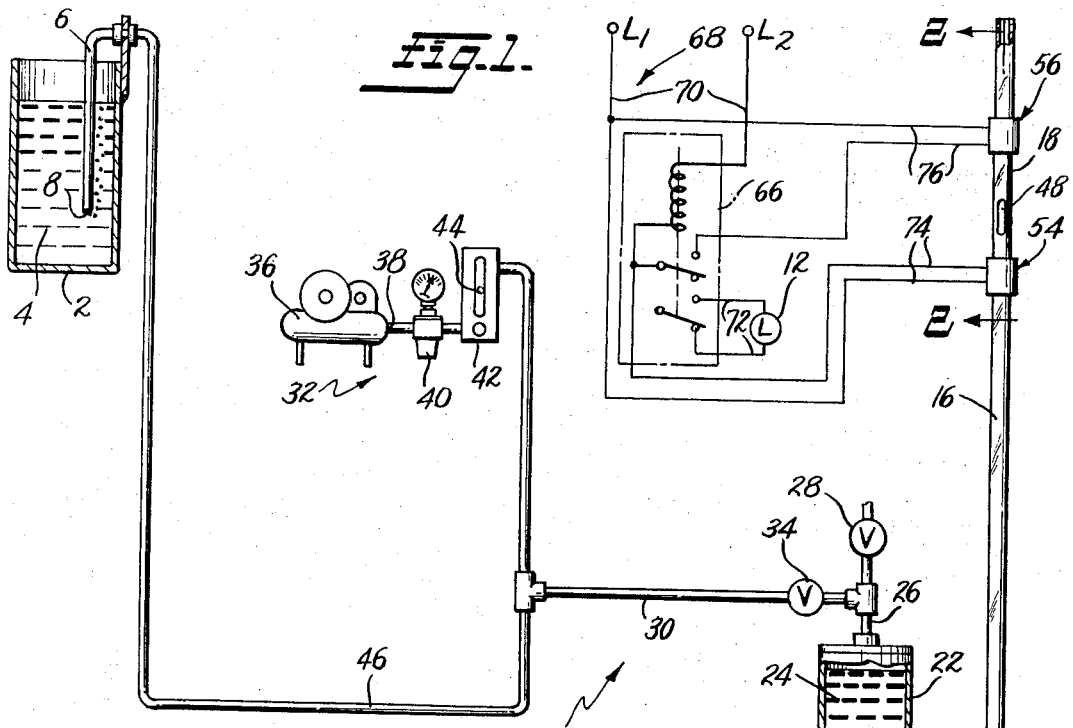
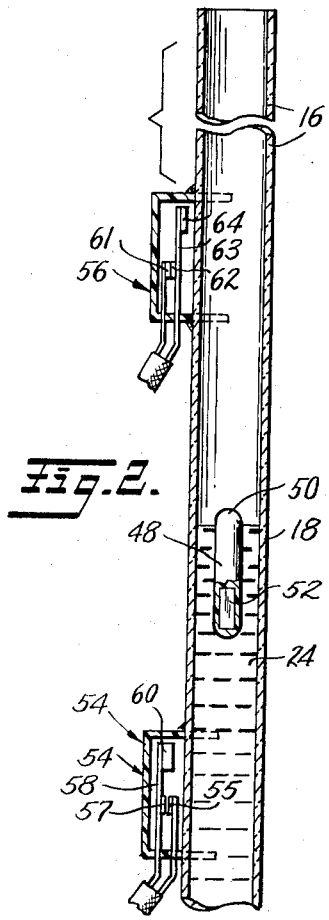
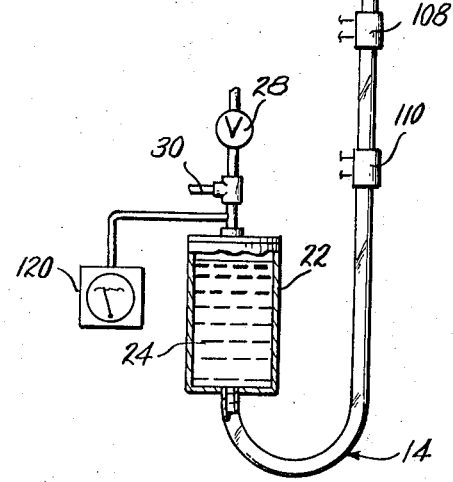
Fig. 1.
Fig. 2.
Fig. 3.

LIQUID LEVEL RESPONSIVE CONTROL SYSTEM

BACKGROUND OF THE INVENTION

1. Field of the Invention

The present invention relates generally to systems for operating equipment in response to the level of a controlling liquid. More particularly, it relates to an improved control system responsive to the level of a controlling liquid as measured by a bubbler tube apparatus, and which is easily read and adjusted.

2. Description of the Prior Art

The need frequently arises for a control system that is capable of operating equipment in response to the level of a controlling liquid. For example, in water systems and the like, such control systems are utilized to operate supply pumps when the level of the controlling liquid in a storage reservoir or a similar vessel falls below a given level. In a different situation, it frequently is desirable to actuate a drain pump in response to the accumulation of a controlling liquid within a sump, to prevent swamping or overlflows.

Over the years, there have been many different control systems devised for operating various kinds of equipment in these and similar situations. Such control systems should have several attributes, if they are to prove both economical and practical for general application. For example, a control system should be mechanically simple to reduce both the initial cost and the costs of maintenance, and to increase the reliability thereof. In addition, the control system should be designed so that it can be easily calibrated and operated by persons not possessing a high degree of technical training. Finally, it should be designed to provide a maximum of operating information to an observer merely upon a visual inspection thereof, thus eliminating the need for lengthy and technically involved inspections that are costly, and which increase the chance for error. Because no existing control system is known that does so, there is need for a control system that possesses all of these attributes. The present invention is intended to satisfy that need.

SUMMARY OF THE INVENTION

In the present invention a U-tube is provided, with one upwardly extending leg thereof including at least a portion that is transparent to constitute a sight glass. The other leg of the U-tube is connected to a pressure vessel, the vessel and the U-tube receiving an operating liquid. A source of gas pressure, which in the preferred embodiment comprises an air compressor with a regulator and a rotometer connected to the outlet thereof, is connected by a first conduit to the pressure vessel, for placing pressure on the operating liquid to force such into the U-tube.

The controlling liquid for the system can be any of several different kinds and used for different purposes, and is disposed in a container. The container can also be any one of several different types, such as a water tower, a supply tank, a sump, or the like. Received within the container that the lower open end thereof is immersible within the controlling liquid is a bubbler tube, of the type known in the art, the tube being connected by a second conduit to the first conduit. As is known, when the level of the controlling liquid relative to the immersed lower open end of such a bubbler tube is varied, the rate at which gas pressure escapes from the bubbler tube is also varied. This causes a variation in the gas pressure applied to the pressure vessel of the invention, which is reflected in the level of the operating liquid within the U-tube.

A float is disposed within the sight glass portion of the U-tube leg, to rise and fall with the level of the operating liquid, the float containing magnetic means. The float gives a visual indication of the relative level of the controlling liquid in the container, and additionally functions to separately operate a plurality of switches mounted on the sight tube.

The switches of the invention are magnetic responsive, whereby they are activated when the magnetic means-containing float passes thereby, and are connected into a circuit for operating equipment controlled by the system. According to the conecpt of the invention, at least two spaced switches are employed, whereby the upper one will be operated when the level of the operating liquid rises above a pre-selected height in the first leg of the U-tube, and the lower one will be operated when the liquid falls below a pre-selected level. By connecing the upper and lower switches through a suitable circuit including holding relays, it is readily seen that the invention can be utilized to turn a supply pump on and off when the container is a storage tank or a water tower, for example, and to turn a drain pump on and off when the container is a sump or the like.

The switches of the invention are slidable on the sight glass, and thus the system can be easily and quickly adjusted. Testing of the circuit is easily done, merely by passing a hand-held magnet over the respective switch to activate it. Moreover, the locations of the switches and of the float are readily observed by a simple visual insection, whereby the condition of the system is easily determined.

Should it be desirable to maintain a record of the operation of the control system, this is easily done by merely connecting a pressure recording chart to the first or second conduit means. In addition, the invention can easily handle several magnetic-responsive switches spaced along the sight glass portion of the U-tube, whereby they will be progressively operated by the float. With such an arrangement several different items of equipment can be operated in a cascade fashion, if desired, to provide a wide range of response to a change in the level of the controlling liquid.

This progressive switch arrangement is especially valuable, for example, in a water system during periods of varying water demand. When the demand is light, the level of the stored water can be restored by a light duty pump, connected to be operated by the first switch in the operating sequence of the system. Should such light duty pump be inadequate to restore the level of the stored water, perhaps because of unusually great demand, then the second switch in the sequence is arranged to bring further pumping capacity into play when the level of the operating liquid falls to cause the float to pass thereby, and so on. The final switch in the array might well be connected to an alarm network, to summon assistance if a pre-set maximum deleterious condition is exceeded.

While the preferred embodiment of the invention includes an air compressor to supply gas pressure, it is to be understood that other arrangements are also possible, It is the principal object of the present invention to provide a control system for operating selected equipment, responsive to the level of a controlling liquid within a container, and which is economical to construct and maintain, and easily operated.

A further object is to provide a control system that provides an easily observed visual indication of the relative level of the controlling liquid, and of the state of a plurality of operating switches in relation to said level.

Yet another object is to provide a control system incorporating a plurality of switches, wherein said switches can be easily test operated to determine the condition thereof, and to test the control circuit for operating the equipment connected to the system.

It is also an object to provide a control system incorporating a plurality of float-operated switches, designed for rapid an easy calibration and adjustment.

A further object is to provide a control system incorporating liquid level sensing means and switch means, wherein the switch means can be located remotely from and at any desired elevation relative to the container holding the controlling liquid that is sensed by the sensing means.

Other objects and many of the attendant advantages of the present invention will become readily understood from the following Description of the Preferred Embodiment, when taken in conjunction with the accompanying drawings.

BRIEF DESCRIPTION OF THE DRAWINGS

FIG. 1 is a diagrammatic view of the liquid level responsive control system of the invention, showing a pair of magnetically-responsive switches connected through a magnetic relay to operate a load;

FIG. 2 is an enlarged, axial sectional view taken along the line 2—2 of FIG. 1, and showing in detail the magnetic-responsive swithces, the float, and the operating liquid carried by the sight glass portion of the U-tube; and FIG. 3 is a diagrammatic view of a variation of the invention wherein several switches are arranged along the sight glass for sequential opeation by the float, a recording pressure meter being connected into the system to provide a time and pressure record of the operation thereof.

DESCRIPTION OF THE PREFERRED EMBODIMENT

Referring now to the drawings, a container is indicated generally at 2, containing a controlling liquid 4. In practice the container 2 can be a water tower, a storage tank or reservoir, a sump, or any other vessel for containing a liquid. Further, the controlling liquid 4 can be water, or any other liquid material. Mounted on the container 2 is a conventional bubbler tube 6, having an open lower end 8 that is immersed in the controlling liquid 4. The bubbler tube 6 is utilized to detect the level of the controlling liquid 4, as will be explained, and is associated with the control system 10 of the invention for operating equipment or a load 12 in response to the level of the controlling liquid 4.

The load 12 can be a pump for supplying make-up liquid to the container 2, or perhaps merely a warning device for alerting workmen to the dropping level of the controlling liquid 4. Should the container 2 be a sump, then the load 12 might be a drain pump. Obviously, the nature of the load or equipment 12 can be varied, and is a matter of choice.

The control system 10 of the invention includes a U-tube 14 comprising a first leg 16 having at least a portion 18 thereof that is transparent to provide a sight glass, and a second leg 20. The second or other leg 20 is connected to a pressure vessel 22, and the vessel 22 and the U-tube 14 contain a suitable operating liquid 24. The pressure vessel 22 has a fitting 26 thereon; to which is connected a drain valve 28 and a first conduit 30, the first conduit 30 being connected to a source of gas pressure 32 through a control valve 34. When gas pressure is admitted to the pressure vessel 22, it is apparent that the operating liquid 24 will be forced into the U-tube 14. The height to which the operating liquid 24 will rise in the first or sight glass leg 16 of the U-tube 14 will of course depend directly upon the amount of the gas pressure admitted to the pressure vessel 22 through the fitting 26.

While the gas pressure source 32 can be any of several different types, in the preferred embodiment of the invention such comprises an air compressor 36 having an outlet 38, the outlet 38 being connected through a pressure regulator 40 and a rotometer 42 to the first conduit 30. The pressure regulator 40 provides a selected stable air pressure for the system, and the rotometer 42 contains a marker element 44 that functions to visually indicate the rate of airflow, and fluctuations therein.

A second conduit 46 connects the bubbler tube 6 with the first conduit 30. Thus, the amount of air pressure within the pressure vessel 22 will depend on the rate of air loss through the bubbler tube 6, which in turn is dependent upon the level of the controlling liquid 4 in which the bubbler tube is immersed. It is thus evident that the height of the operating liquid 24 within the sight glass leg 16 of the U-tube 14 is proportional to the level of the controlling liquid 4. Obviously, the U-tube 14 can be positioned remotely from the container 2, and can be positioned at any desired level relative to the container 2, without interferring with the operation of the control system. Thus, the control system 10 of the invention can be located for easy access within a control room or the like, where an operator can readily visually observe the same.

Received within the sight glass portion 18 of the U-tube 14 to float on the operating liquid 24 is a float 48, comprising a bouyant body 50 containing a magnet 52. The float 48 rises and falls with the level of the operating liquid in the leg 16, and this provides a clear visual indication of the relative level of the controlling liquid in the container 2.

The magnet-containing float 48 is utilized in the preferred embodiment of the invention to operate a pair of magnetic-responsive switches 54 and 56, each of which can be mounted where necessary along the sight glass portion 18. The lower switch 54 contains a fixed contact 55 and a moveable contact 57, the contact 57 being carried by a reed 58 having a magnetically responsive mass 60 on its outer end that will be attracted toward the leg 16 to close the switch when the magnet-containing float 48 is disposed in confrontation thereto. The upper switch 56 is of similar construction, but the contacts thereof are reversed, and the upper switch is normally closed. Referring to the drawings, the upper switch 56 includes an outer, fixed contact 61 that is normally in engagment with a moveable contact 62 carried by a reed 63 having a magnetic responsive mass 64 on the outer end thereof. When the magnet-containing float 48 is disposed in confrontation to the magnetically responsive mass 64 the reed 63 will bend toward the leg 16, and the upper switch 56 will open. It is to be understood that magnetic responsive switches of other types can be substituted for the magnetic-responsive switches 54 and 56 shown herein, if desired.

The switches 54 and 56 are intended to operate the load 12, when the level of the controlling liquid 4 changes sufficiently to pass the magnet-containing float 48 before the switches. By properly selecting the elevations on the sight glass portion 18 where the switches 54 and 56 are placed, the load or equipment 12 can be operated as desired. Since the switches 54 and 56 are actuated only when the flaot 48 is in front thereof, if prolonged operation of the load 12 is desired some sort of holding circuit must be employed, to maintain the load 12 in a desired state or mode after the float 48 rises or falls out of the operating range of a specific switch 54 or 56. Such holding circuit arrangements are known in the art, and one such is illustrated in FIG. 1.

In FIG. 1 a conventional two-pole relay 66 is employed in a circuit for operating the load 12, the relay 66 being connected to a power supply 68 by leads 70, and to the equipment or load 12 by leads 72. Leads 74 connect the lower switch 54 to the relay 66, and similarly leads 76 connect the upper switch 56 thereto. The relay 66, as is known from the art, will remain energized once actuated by the switch 54 until the holding circuit through the relay contacts and switch 56 is opened by actuation of switch 56.

To illustrate the manner of operation of the preferred embodiment of the present control system, assume that the load or equipment 12 constitutes a pump connected to resupply controlling liquid 4 to the container 2. In this instance, the float 48 will fall when the level of the controlling liquid 4 falls. The lower switch 54 is connected into the circuit to actuate or energize the relay 66 for starting the pump 12 when the float 48 is in confrontation thereto, whereas the upper switch 56 is connected to the relay 66 so as to cut off the supply of current to the relay coil to de-energize the relay 66 when the magnet-containing float 48 is in confrontation therewith, whereby the circuit to the pump or load 12 is opened.

Assume that the level of the controlling liquid 4 falls to a pre-selected level where it has been decided replenishment should begin. The lower switch 54 has been placed on the sight glass portion 18 at an elevation corresponding to this preselected level, and thus when the float 48 passes the lower switch 54 the pump or load 12 will be energized and replenishment of the container 2 will commence. The pump 12 will continue to operate until the level of the controlling liquid 4 has risen sufficiently to cause the float 48 to pass in front of the upper switch 56, whereupon the switch 56 will be opened, thus de-energizing the relay 66 and opening the circuit leading to the pump or load 12. Replenishment of the controlling liquid 4 will then cease.

By way of a second example, assume that the container 2 is a sump, and that the load 12 is a drain pump. In this instance it is desired to actuate the drain pump when the level of the controlling liquid 4 rises above a pre-set level, to effect draining off of excess liquid from the container 2. To accomplish this, the positions of the switches 54 and 56 would merely be reversed, so that the drain pump would be turned on when the float 48 rose to a pre-selected level in the sight glass portion 18, and so that the pump would be turned off when the float 48 returned downwardly to its acceptable level.

Obviously, many different devices can be operated by the control system of the invention, depending upon the needs, and where the switches 54 and 56 are placed. It is to be understood that other known holding circuits can be employed instead of the relay circuit shown, this being a matter of choice for the user. It is also to be understood that if desired another source of compressed gas can be substituted for the compressor 30, say a bottled gas or the like.

Referring now to FIG. 3, a second embodiment of the invention is shown wherein several switches 100, 102, 104, 106, 108 and 110 are placed on the sight glass portion 18 of the U-tube 14. By this type of an arrangement a series of loads can be actuated in sequence, as the float 48 moves upwardly and downwardly in the sight glass portion 18. For example, assume a municipal water tower constitutes the container, and that it is subject to periods of light use and periods of heavier use. In this instance, the switch 102 might be employed to bring a light duty replenishment system into action, when a first level of low water is detected by the float 48. If this occurs during a period of light water demand, then the light duty system will prove adequate to replenish the container 2, and the system will be turned off after a period of time when the float 48 rises past the "OFF" switch 100. But if it is a period of intermediate demand, then the float 48 may continue to fall, until it actuates the switch 106 to turn on a second replenishment system, and so forth. The bottom switch 110 can be connected to an alarm system, in case a minimum level is exceeded.

This cascade operation of the present invention can obviously be modified depending upon the control demands involved, and is very easy to set up merely by placing the switches 100 through 110 where desired on the sight glass portion 18. It is thus evident that the system 10 of the invention is highly flexible, to meet many different control situations.

In some instances it may also be desirable to have a permanent record made of the operation of a system. This is easily accomplished in the present invention, by installing a recording pressure gauge of the conventional type, as shown in FIG. 3. Referring to said FIG., a gauge 120 is shown connected into the first conduit 30, although it could also be connected into the conduit 46. The gauge 120 is of the type that charts pressure variations over a period of time, and the resultant chart will detail the operation of the control system 10.

It is easily seen that the sight tube 18 can be readily observed by an operator, and that such operator can readily determine the location of the float 48, and hence the relative level of the controlling liquid 4 in the tank 2. Should it be desired to test out the control circuit, this is easily done with the invention merely by placing a magnet adjacent the desired switch, to effect operation thereof. This can be done without in any way interfering with the normal operation of the system 10, a unique feature of the invention. In addition, the responsiveness of the system 10 is easily varied merely by sliding the switches to new positions.

It is thus seen that a control system has been provided that satisfies all of the objects hereinabove set forth. Obviously, many modifications and variations are possible, without departing from the invention.

I claim

1. A system for remotely operating equipment in response to the level of liquid within a container, said system including: a pressure vessel; a U-tube connected at one end thereof with said pressure vessel; operating liquid within said pressure vessel and said U-tube; a source of gas pressure; a bubbler tube disposed in said container; first conduit means connecting said source of gas pressure with said pressure vessel for placing said operating liquid under pressure; second conduit means connecting said first conduit means with said bubbler tube; a float within said U-tube, and containing magnetic means; at least two magnetically responsive switches mounted on said U-tube, and arranged to be operated by said magnetic means within said float when said float passes said switches during changes in the level of said operating fluid within said U-tube, said changes of level of said operating fluid occuring in response to the effect upon said bubbler tube of changing levels of liquid within said container; and circuit means connecting said switches with said equipment to be operated.

2. A system is recited in claim 1, wherein said U-tube is transparent at least over the region where said float operates to allow visual observation of said float.

3. A system as recited in claim 1, wherein said source of gas pressure comprises: a source of compressed air; regulator means connected between said source of compressed air and said first conduit; and a rotometer connected between said regulator means and said first conduit means, and including a visible flow indicating element.

4. A system as recited in claim 1, wherein at least three magnetically responsive switches are mounted upon said sight glass, said switches being effective to control different equipment in response to different levels of liquid within said container.

5. A system as recited in claim 1, including additionally: a recording pressure meter connected with one of said first and said second conduits, and effective to produce a charted record of pressure flucuations within the system.

6. A system as recited in claim 1, wherein said circuit means includes: holding means for maintaining a supply of current to said equipment while said float moves from a first, "ON" switch to a second, "OFF" switch.

* * * * *